United States Patent
Kraft et al.

(10) Patent No.: US 10,152,403 B2
(45) Date of Patent: Dec. 11, 2018

(54) ASSESSMENT OF SOFTWARE CODE QUALITY BASED ON CODING VIOLATION INDICATIONS

(75) Inventors: Bernhard F. Kraft, Dreieich (DE); Shantiprakash Motwani, Mumbai (IN); Colin P. Jarrett, Surrey (GB); Anirudha Singh, Mumbai (IN); Reva Modi, Mumbai (IN); Vikrant Shyamkant Kaulgud, Maharashtra (IN); Vibhu Saujanya Sharma, Aligarh (IN)

(73) Assignee: Accenture Global Services Limited, Dublin (IE)

( * ) Notice: Subject to any disclaimer, the term of this patent is extended or adjusted under 35 U.S.C. 154(b) by 1831 days.

(21) Appl. No.: 12/873,810

(22) Filed: Sep. 1, 2010

(65) Prior Publication Data

US 2011/0055798 A1    Mar. 3, 2011

(30) Foreign Application Priority Data

Sep. 1, 2009  (IN) .......................... 1987/MUM/2009

(51) Int. Cl.
 *G06F 9/44*    (2006.01)
 *G06F 11/36*   (2006.01)
 *G06F 8/77*    (2018.01)
(52) U.S. Cl.
 CPC ............ *G06F 11/3604* (2013.01); *G06F 8/77* (2013.01)

(58) Field of Classification Search
 USPC ........................................... 717/110
 See application file for complete search history.

(56) References Cited

U.S. PATENT DOCUMENTS

| 5,860,011 | A  | * | 1/1999  | Kolawa et al. ............... 717/142 |
| 6,473,896 | B1 | * | 10/2002 | Hicken et al. ............... 717/132 |
| 2006/0123389 | A1 |   | 6/2006  | Kolawa et al. |
| 2010/0023928 | A1 | * | 1/2010  | Hentschel et al. ........... 717/124 |
| 2011/0022551 | A1 | * | 1/2011  | Dixon ............................ 706/12 |

OTHER PUBLICATIONS

Kiss, Nicko; "Code Reviews: Manual or Automated?"; Jan. 31, 2009; Software Development Best Practices Blog; pp. 1-7.*

* cited by examiner

*Primary Examiner* — Wei Zhen
*Assistant Examiner* — Clint Thatcher
(74) *Attorney, Agent, or Firm* — Harrity & Harrity, LLP

(57) ABSTRACT

A plurality of coding violation indications corresponding to software code are categorized according to a plurality of coding quality attributes. The coding violation indications may be reported via static analysis tools or via manual analysis of the software code. The categorized coding violations serve as the basis for determining a plurality of code quality indices each corresponding to a respective one of the plurality of coding quality attributes. In an embodiment, the plurality of code quality indices may be further processed to determine an overall code quality index for the software code. One or more of the resulting code quality indices may be displayed to a user. In this manner, code quality indices may be provided that are directly based on coding violations reported through static analysis.

20 Claims, 3 Drawing Sheets

| Coding Quality Attribute | Automated | Manual | Index |
|---|---|---|---|
| Functionality - Completeness | 8.00 | 7.50 | 7.75 |
| Functionality – Design Elegance | 7.00 | 8.00 | 7.40 |
| Reliability | 7.00 | 7.00 | 7.00 |
| Efficiency / Performance | 4.00 | 6.00 | 4.40 |
| Maintainability – Coding Standards Adherence | 8.00 | 8.00 | 8.00 |
| Maintainability – Architecture Adherence | 8.00 | 7.50 | 7.75 |
| Testability | 6.00 | 7.50 | 6.75 |
| Security | 8.00 | 7.00 | 7.50 |
| Scalability | 7.00 | 7.00 | 7.00 |
| Average | 7.11 | 7.28 | 7.19 |

ASSESSMENT OF SOFTWARE CODE QUALITY BASED ON CODING VIOLATION INDICATIONS

FIELD OF THE INVENTION

The instant disclosure relates generally to the assessment of software code quality and, in particular, to the determination of one or more code quality indices based on the coding violation information.

BACKGROUND OF THE INVENTION

As known in the art, software code comprises instructions that may be used to control or instruct the operation of one or more processing devices, such as microprocessors, microcontrollers, co-processors, etc. Indeed, software code is ubiquitous and pervades many aspects of modern day technology. Further, it is not uncommon for software development projects to require the services of numerous software code developers and their supervisors for periods of time stretching over many months or even years. In order to produce, well-designed, efficient code, it is crucially important to engage in quality assessments, i.e., to take those steps necessary to ensure code is being written in accordance with industry and project-specific quality standards and is meeting appropriately defined benchmarks. Usually, project code quality standards and benchmarks are pre-defined for a project, either by the customer, by the software development service provider or both.

As known in the art, the quality of software code may be established through a variety of techniques including, but not limited to, static analysis and dynamic analysis (i.e., runtime testing). As known in the art, static analysis may be performed using manual or automated techniques. For example, in the case of software developed using "JAVA" programming, various automated tools such as Checkstyle, FindBugs and PMD may be employed to determine whether software code has been developed such that it fails to adhere to or violates accepted coding standards. While the ability to automatically collect information of this type is certainly beneficial, those having ordinary skill in the art will appreciate that determining the existence of coding standard violations doesn't necessarily provide an accurate picture of the overall quality of the software code.

For example, simple determination of numbers of coding violations does not always translate to an accurate representation of software code quality because not all violations are equivalent. That is, certain critical coding standard violations will inevitably have a greater negative impact on software code quality than other types of non-critical violations. Thus, a portion of software code that has a relatively large number of non-critical violations may still have greater perceived quality than a comparable portion of software code that gives rise to a single critical violation. It is known in the art for static analysis tools, such as those mentioned above, to categorize violations according to some standard of criticality. However, given the divergent nature of the specific checking performed by the different analysis tools as well as the non-standardized definition of the criticality of respective identified coding standard violations, the determination of software code quality remains an oftentimes difficult interpretive task. On sufficiently large software coding projects, the simple size of the code base may prevent any meaningful determination of overall software code quality despite the existence of automated static analysis tools.

Further still, those having ordinary skill in the art will appreciate that automated static analysis tools cannot provide 100% coverage of all potential coding standards violations. That is, while such tools are typically capable of determining coding language syntax errors or the like, they are typically incapable of detecting violations that are more "macroscopic" in nature. For example, software modules that have been perfectly coded in accordance with syntax rules and coding best practices may nevertheless be at odds with high level architectural design of the software code. Under current practice, such violations are only detectable through manual inspection of the software code. Even assuming such manual reviews are performed, the resulting error information still requires (as in the case of the automated analysis results) further interpretation to ascertain the actual quality of the software code.

Thus, it would be advantageous to provide techniques for determining software code quality that overcome the limitations of prior art approaches.

SUMMARY OF THE INVENTION

The instant disclosure describes techniques for determining one or more software code quality indices based on reported violations of software coding standards. In an embodiment, this is accomplished by categorizing a plurality of coding violation indications concerning software code according to a plurality of coding quality attributes. The coding violation indications, in addition to being reported via static analysis tools, may also be reported based on manual analysis of the software code. Thereafter, the categorized coding violations serve as the basis for determining a plurality of code quality indices each corresponding to a respective one of the plurality of coding quality attributes. In one embodiment, the code quality index for a given coding quality attribute is determined by first normalizing an attribute violation count corresponding to the coding quality attribute. According to another embodiment, the attribute violation count is normalized according to a size of the software code. Regardless, the normalized attribution violation count is then used to determine the code quality index for the coding quality attribute. Further still, the plurality of code quality indices may be further processed to determine an overall code quality index for the software code. One or more of the resulting code quality indices may be displayed to a user. In this manner, code quality indices may be provided that are directly based on coding violations reported through static analysis but that overcome limitations arising in the prior art.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
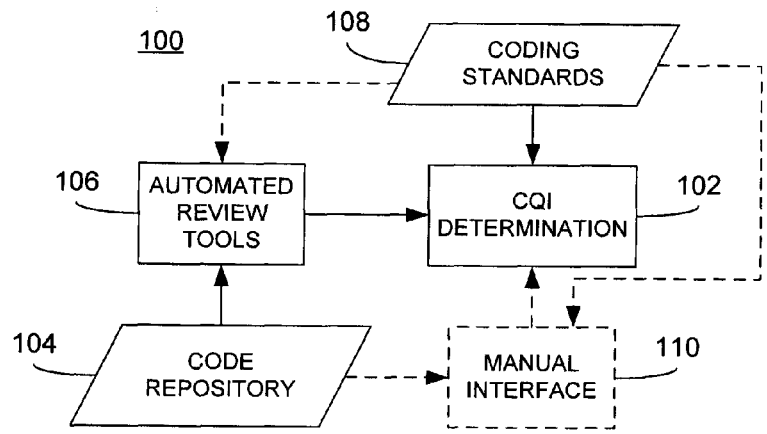
FIG. 1 is a block diagram of a system for the development of software code in accordance with the instant disclosure.

FIG. 1 illustrates a system 100 in accordance with the instant disclosure that may be used for the development of software code. In particular, the system 100 comprises a code quality index (CQI) determination component 102 and a code repository 104. The code repository, which may comprise, for example, one or more suitable storage server computers implementing suitable revision control or source code management (SCM) applications, stores the software code under consideration. The CQI determination component 102, which may be implemented using one or more suitable processing device (such as a laptop or server computer or the like) is operatively coupled to one or more automated review tools 106 that operate upon the codebase stored in the code repository 104 and provide resulting coding violation indications to the CQI determination component 102. Various automated review tools 106 are known to those having ordinary skill in the art and include, by way of non-limiting example, Checkstyle, FindBugs and PMD analysis tools that are widely used in conjunction with software projects employing the "JAVA" programming language. As known in the art, such tools 106 may operate upon the basis of internally defined rules or constraints, but may also be used to enforce externally developed standards as illustrated by the dotted line between the coding standards storage 108 and the automated review tools 106. Regardless, as used herein, a coding violation indication may comprise any output from the one or more automated review tools 106 signifying some manifestation of a deviation from accepted coding standards, which coding standards may include the internally defined standards of the tool(s) 106, industry-wide standards or standards particularly defined for a given software development project, e.g., by the software code developer and/or client. The coding standards storage 108, which may comprise any suitable computer-compatible memory or storage device, includes those coding standards not internally stored by the automated review tools 106 and further includes a mapping of the various potential coding violation indications and a plurality of coding quality attributes used to categorize the coding violation indications.

As further shown, the CQI determination component 102 may also interact with or comprise a manual interface 110 whereby coding violation indications based on manual reviews of the software code in the repository 104 can be employed. In an embodiment, the manual interface 110 may comprise suitable data entry fields in a graphical user interface or the like whereby a user of the system 100 can enter data concerning one or more manually-determined coding violation indications. Alternatively, the interface 110 may comprise a suitable machine interface, such as a serial or parallel data port, configured to receive any manually-determined data from another device (e.g., computer) not shown. Furthermore, the interface 110 may comprise guidance, as described in further detail below, for manually determining coding violations and code quality metrics based thereon. Regardless, such manually-entered data may be incorporated into the determination of one or more code quality metrics as described in greater detail below.

Those having ordinary skill in the art will appreciate that various ones of the elements illustrated in FIG. 1, although illustrated separately, could in fact be implemented in a unified fashion. For example, the CQI determination component 102 and the coding standards storage 108 could be implemented in a single, appropriately programmed computer and, further still, that the automated review tools 106 could be implemented by this same platform. Any of a number of such variations is possible and it is understood that the instant disclosure is not limited in this regard.

Figure 2:
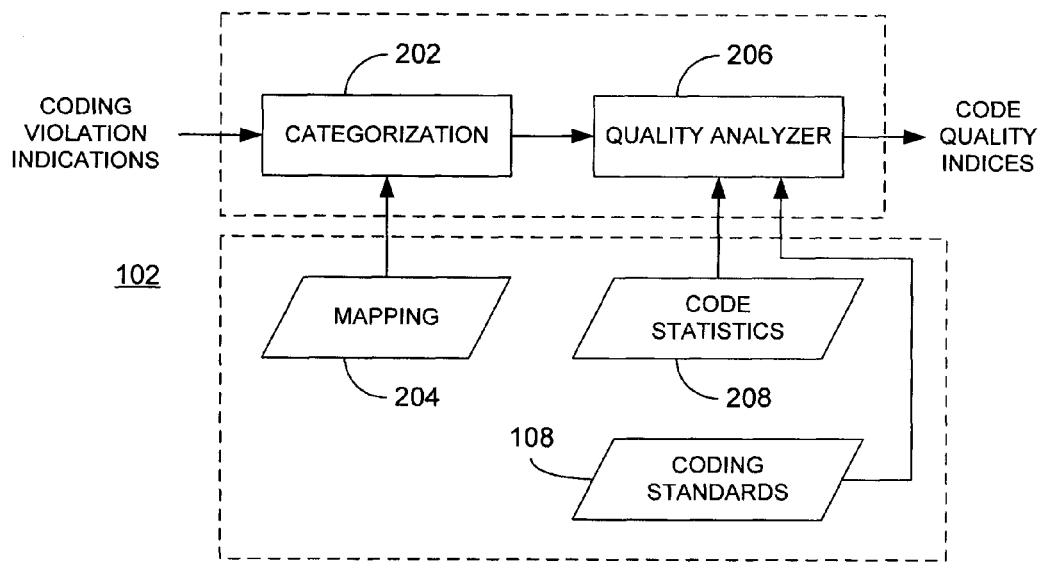
FIG. 2 is a block diagram illustrating an embodiment of the code quality index determination component of FIG. 1 in greater detail.

Referring now to FIG. 2, an implementation of the CQI determination component 102 is illustrated in greater detail. In the illustrated embodiment, the CQI determination component 102 comprises a categorization component 202 operatively coupled to a quality analyzer component 206. The categorization component 202 takes as input the various coding violation indications and, based on one or more mappings 204, categorizes the coding violation indications. The resulting categorized violation indications are then provided to the quality analyzer component 206 that, in turn, determines one or more code quality indices based on the categorized violation indications. In the illustrated embodiment, the quality analyzer component 206 is operatively coupled to the coding standards storage 108 from which it can obtain the various coding quality attributes. Likewise, the quality analyzer component 206 is operatively coupled to a code statistics storage 208 whereby the size of the software code (i.e., the NCSS described below) may be obtained.

Figures 3, 4:
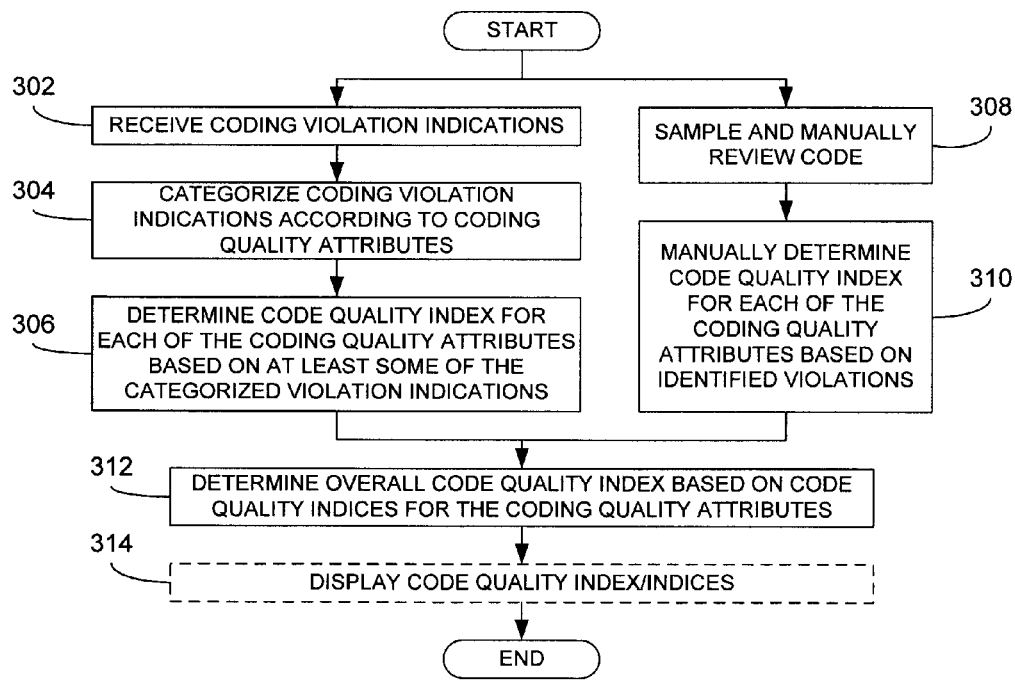
FIG. 3 is a flowchart illustrating processing in accordance with one or more embodiments described herein.
FIG. 4 is a representative example of a graphical user display illustrating a plurality of coding quality attributes, their corresponding code quality indices and an overall code quality index.

Referring now to FIG. 3, a flowchart illustrating processing in accordance with the instant disclosure is illustrated. The processing of FIG. 3, may be implemented using stored instructions executed by one or more suitable processors although, as noted above, other hardware-based implementations may also be employed. For example, in one embodiment, the processing of FIG. 3 may be implemented, at least in part, by the CQI determination component 102 implemented using a processing device. Regardless, processing begins at block 302 where a plurality of coding violation indications are received. Generally, the instant disclosure is not limited by the manner in which the plurality of coding violation indications are received. In one embodiment, the coding violation indications may be received once a day, week, month, etc., i.e., according to some periodic or on-demand schedule whereby static code analysis is automatically performed. For example, the automatic review tools 106 may perform the desired analysis one per day at a set time such that all available software code in the repository 104 is reviewed. In this case, the coding violation indications may be reported as one or more data files, e.g., one from each tool 106. Alternatively, the coding violations indication may be generated each time a portion of software code is checked into the repository 104. In this case, the tools 106 are invoked in response to the code being checked into the repository, with the resulting coding violation indications (if any) being aggregated as necessary by the CQI determination component 102, for example. Note that such automatic reporting may also be performed regardless when the manual processing (blocks 308-310 discussed below) is performed, i.e., they may synchronized or not.

Regardless, processing continues at block 304 where the plurality of coding violation indications are categorized according to a plurality of coding quality attributes. As used herein, the coding quality attributes comprise accepted and/ or standardized characteristics or category definitions used to understand the perceived quality of software code. For example, in one embodiment, the coding quality attributes used herein are based on the so-called ISO 9126 standard for the evaluation of software quality. Table 1 below illustrates the general characteristics established according to the ISO 9126 model.

TABLE 1

| Characteristic/Attribute | Description |
| --- | --- |
| Functionality | One or more attributes that bear on the existence of a set of functions and their specified properties, which functions satisfy stated or implied needs. |
| Reliability | One or more attributes that bear on the capability of software to maintain its level of performance under stated conditions for a stated period of time. |
| Usability | One or more attributes that bear on the effort needed for use, and on the individual assessment of such use, by a stated or implied set of users. |
| Efficiency | One or more attributes that bear on the relationship between the level of performance of the software and the amount of resources used, under stated conditions. |
| Maintainability | One or more attributes that bear on the effort needed to make specified modifications. |
| Portability | One or more attributes that bear on the ability of software to be transferred from one environment to another. |

Of course, the ISO 9126 is but one example of an attribute taxonomy that may be employed for this purpose, and the instant disclosure is not limited in this regard. FIG. 4 illustrates a plurality of coding quality attributes 402 based on the ISO 9126 model.

Categorization of the coding violation indications according to the coding quality attributes may be implemented in any convenient fashion. For example, in one embodiment, one or more mappings are provided associating specific coding violation indications with particular ones of the coding quality attributes. For example, Tables 2 and 3 below list a number of coding violation indications respectively produced by the Checkstyle and PMD automated review tools and their corresponding classification according to plurality of coding quality attributes 402.

TABLE 2

| Coding Violation Indication | Coding Quality Attribute |
| --- | --- |
| AvoidStarImport | Maintainability - Coding Standards Adherence |
| HiddenField | Reliability |
| IllegalCatch | Reliability |
| IllegalInstantiation | Reliability |
| IllegalThrows | Reliability |
| MagicNumber | Testability |
| RedundantThrows | Maintainability - Coding Standards Adherence |
| GenericIllegalRegexp(Check for System.out.println) | Maintainability - Coding Standards Adherence |

TABLE 3

| Coding Violation Indication | Coding Quality Attribute |
| --- | --- |
| UnconditionalIfStatement | Efficiency/Performance |
| BooleanInstantiation | Efficiency/Performance |
| EmptyIfStmt | Functionality - Completeness |
| EmptyWhileStmt | Functionality - Completeness |
| BigIntegerInstantiation | Functionality - Design Elegance |
| ExcessiveParameterList | Functionality - Design Elegance |
| AvoidUsingHardCodedIP | Maintainability - Architecture Adherence |
| MoreThanOneLogger | Maintainability - Architecture Adherence |
| DoNotCallGarbageCollectionExplicitly | Scalability |
| AvoidCatchingThrowable | Scalability |

Of course, other similar mappings based on other review tools may be readily developed by those having ordinary skill in the art. By mapping the coding violation indications in this manner, context is added that allows the coding violations indications to be assessed in a meaningful way, particularly in a way that facilitates the determination of one or more code quality indices.

Referring once again to FIG. 3, processing continues at block 306 where a code quality index is determined for each of the coding quality attributes based on at least some of the categorized violation indications produced by the process of block 304. For example, this could be done by simply providing the total number of categorized violation indications for a given coding quality attribute as the index. In one embodiment, a more sophisticated approach is employed for determining a code quality index for a given coding quality attribute. In this embodiment, the "completeness" of the categorized violation indications is taken into account. As known in the art, automated analysis tools have varying levels of coverage for checking violations of different types, and thus the coverage for determining the coding violations contributing to one of the attributes may not be as complete as the coverage relative to another attribute. Thus, if the coverage for a first attribute is not as complete as the coverage for a second attribute, the determination of the code quality index should take this into account and weight the attribute having less complete coverage less heavily than those attributes having more complete coverage. In this manner, potential upward skewing of the code quality index resulting from a lesser number of reported violations can be mitigated, i.e., the coverage bias of the underlying analysis tools can be accounted for. Additionally, each categorized violation indication is further characterized according to additional severity labels, e.g., "critical" (C), "major" (Ma), "minor" (Mi) or "cosmetic" (Co) violations. Automated static analysis tools of the type described above are capable of assigning such labels to the violation indications. Thus characterized, the categorized violation indications associated with a given coding quality attribute are totaled for each severity level to provide corresponding attribute violation counts. For example, for a given codebase, the "Reliability" coding quality attribute may be considered as having "medium" coverage and have associated therewith 0 critical, 211 major, 18 minor and 68 cosmetic violations. With the exception of cosmetic violations (which do not effect, in this example, code quality), each of these attribute violation counts is thereafter normalized according to the number of non-comment source statements (NCSS), i.e., the total number of lines of executable code in the entire codebase. In equation form:

$$\text{Normalized Attribute Violation Count} = \frac{AVC}{NCSS} * N \qquad \text{Eq. 1}$$

Where AVC is the attribute violation count and N is a constant chosen (e.g., of the same order of magnitude as the NCSS value) to appropriately scale the resulting value. For example, using the above-illustrated values, and assuming NCSS=75,000 and N=1000, the normalized attribute violation counts for the critical, major and minor violations associated with the "Reliability" attribute are 0.00, 2.81 and 0.24, respectively. Note that, in this example, each attribute violation is weighted equally; that is not a requirement as various weighting values may also be applied to the attribute violation counts. Based on these normalized values, the code quality index for the "Reliability" attribute is then determined according to a further mapping of the normalized attribute violation counts to standardized code quality index values. An example of such a mapping based on the current example is illustrated in Table 4 below.

TABLE 4

| If C is greater than: or | Ma is greater than: or | Mi is greater than: | CQI SCORE |
|---|---|---|---|
| 10 | 20 | 30 | 1 |
| 8 | 18 | 25 | 2 |
| 6 | 16 | 20 | 3 |
| 5 | 15 | 18 | 4 |
| 4 | 12 | 16 | 5 |
| 3 | 10 | 14 | 6 |
| 2 | 5 | 12 | 7 |
| 1 | 3 | 10 | 8 |
| 0.5 | 2 | 5 | 9 |
| Else | Else | Else | 10 |

Table 4 illustrates a representative mapping associated with "medium" coverage of coding quality attributes. In the current example, the "major" (Ma) normalized attribute violation count exceeds a value of two, thereby resulting in a code quality index score of 9 for the "Reliability" attribute. By defining similar mappings for the other coverage levels, similar calculations may be employed to determine the code quality indices for the various coding quality attributes. In an embodiment, the threshold values shown in Table 4 would be higher for "high" coverage (i.e., higher normalized attribute violation counts would be needed achieve equivalent CQI scores when compared with "medium" coverage), and would be lower for "low" coverage (i.e., lower normalized attribute violation counts would be needed to achieve equivalent CQI scores when compared with "medium" coverage).

As noted above, in addition to the processing of automatically reported coding violation indications as illustrated by blocks 302-306, manual processing may also be incorporated. Thus, at block 308, the codebase can be sampled for particular portions of code to be reviewed manually. To this end, guidelines can be established for determining which portions of the software code to review. For example, once again referring to a "JAVA" programming language example, criteria such as "All Common services, helper classes", "All Classes having excessive coupling as identified by tools i.e.Ca and Ce with maximum threshold value of 20", "All Classes having more than 400 lines of non commented source code", "All classes making a network (i.e. EJB, JMS, Mainframe)/JDBC call" and/or "Top 30% of the use case based on the number of requirements in each of the use case". Once selected manual review of the code may likewise be performed in light of guidance to determine whether coding violations exist. Table 5 below illustrates representative examples of such guidance:

TABLE 5

| Attribute | Description |
|---|---|
| Functionality - Completeness | Code can be traced back to Design/Functional requirements |
| | Code can be traced back to Component Test |
| | Code demonstrates implementation of all required Business Rules/Conditions (taking care of exceptional scenarios) |
| Functionality - Design Elegance | Code demonstrates implementation of Design Patterns |
| | Code demonstrates effective use of reusable components |
| | Reusable components have been created as part of current implementation |
| Reliability | Effective use of Exception Handling Framework |
| | Application recovers gracefully against technical error conditions (MQ/Database failures etc.) |
| | Effective use of Transaction Management |
| Efficiency/Performance | Application/Batch processes are profiled to ensure effective Memory/CPU utilization and memory leaks |
| | All SQLs/Stored procedures are optimized to expected production volume under peak loads ideally with involvement of qualified DBA |
| | Effective use of connection pool (if applicable) |
| Maintainability - Coding Standards Adherence | Is there Hard-coding of data (e.g. Product Ids, Error Codes, Error Messages, Labels) |
| | Is it well-commented and documented properly? |
| | SQL statements should be in separate constant file instead of embedded in Java code |
| Maintainability - Architecture Adherence | Code demonstrates effective use of defined framework components (Exception handling, logging, Security etc.) |
| | Responsibility of each layer is explicitly defined and adhered to in code |
| Testability | Large number of methods with high Cyclomatic Complexity flagged by automated reviews? Review methods on sampling basis to assess maintainability of code |
| | Have the JUnits been developed and executed successfully? |
| | Is the code coverage from JUnits satisfactory? (Look at output from Code Coverage tool - Typically 60 to 80%) |

TABLE 5-continued

| Attribute | Description |
| --- | --- |
| Security | Is the Authentication mechanism robust to prevent unauthorized access to resources? Is Access Control implemented consistently to provide only privileged access to resources? Is the code vulnerable to Cross Site Scripting Attacks? |
| Scalability | Could the code be a bottleneck that prevents the system from growing to accommodate increased load, data, users or input? |

Thereafter, at block 310, a code quality index for each attribute is likewise manually determined on the basis of the identified violations. Once again, predetermined guidance may be provided to facilitate this determination, e.g., based on the number or type of violations found relative to each attribute. In this manner, a manual code quality index for each coding quality attribute is determined.

Referring once again to FIG. 3, having determined code quality indices for each of the coding quality attributes (including, potentially, the manually determined code quality indices), processing continues at block 312 where an overall code quality index is determined for the entire codebase based on the code quality indices for the respective coding quality attributes. In one embodiment, the plurality of code quality indices for the coding quality attributes are simply averaged together to arrive at an overall code quality index. Thereafter, processing may continue at block 314 where one or more of the code quality indices (potentially including the overall code quality index) may be optionally displayed. An example of this is illustrated with respect to FIG. 4.

FIG. 4 illustrates a graphical user interface 400 in which each of the various coding quality attributes 402 are shown. In particular, each coding quality attribute 402 has associated therewith both an "automated" code quality index 404, a "manual" code quality index 406 and an combined code quality index 408 based on an average of the automated and manual code quality indices 404, 406. As noted above, the manual indices 406 may be entered by a user directly into the graphical user interface 400 or via another channel and subsequently populated in the graphical user interface 400. As further shown, averages across the respective automated and manual code quality indices 404, 406 are provided as well as an overall code quality index 410 based on an average of the combined code quality indices 408. Given the constrained representation of the various code quality indices 404-410, i.e., on a scale from 1 to 10), the graphical user interface 400 provides a straightforward breakdown of code quality along a plurality of meaningful quality-related attributes. Furthermore, although not illustrated in FIG. 4, color coding may be applied to further illustrate the distinctions between the various code quality indices. For example, the various indices could be grouped according to "high" (e.g., 10<CQI<8), "medium" (e.g., 8≤CQI≤4) and "low" (e.g., 4<CQI) and assigned green, yellow and red colors, respectively. It will be appreciated that other color coding schemes or other highlighting schemes could be employed for this purpose as a matter of design choice.

Figure 5:
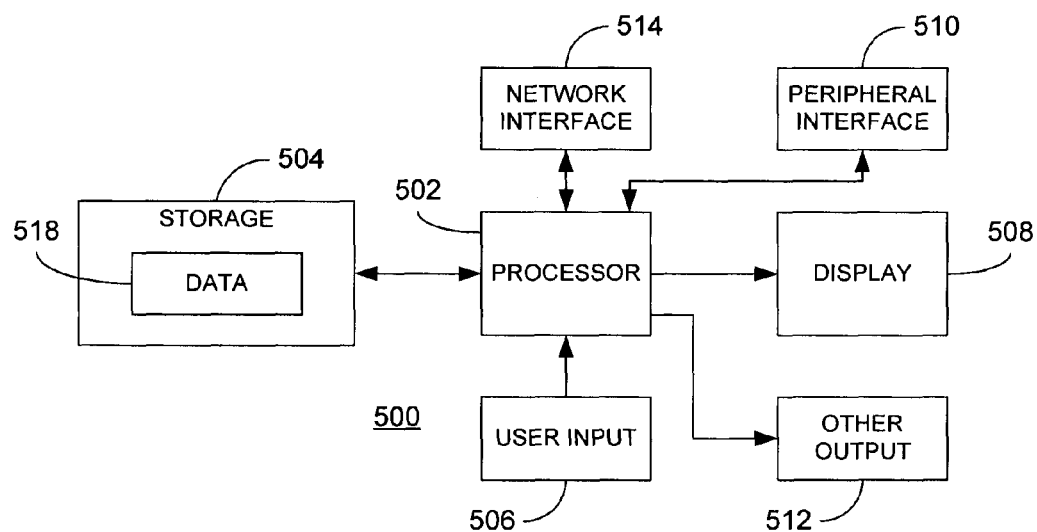
FIG. 5 is a block diagram of a processor-based platform that may be used to implement various embodiments described herein.

Referring now to FIG. 5, a representative processing device 500 that may be used to implement the teachings of the instant disclosure is illustrated. The device 500 may be used to implement, for example, one or more components of the system 100 describe above, particularly the CQI determination component 102. The device 500 comprises at least one processor 502 coupled to a storage component 504. The storage component 504 comprises data 518. In an embodiment, the processor 502 may comprise one or more processing devices such as a microprocessor, microcontroller, digital signal processor, or combinations thereof, capable of executing the instructions and operating upon the stored data 518. In an exemplary embodiment, the CQI component 102 is realized as a processing device. Likewise, the storage component 504 may comprise one or more devices such as volatile or nonvolatile memory including but not limited to random access memory (RAM) or read only memory (ROM). Processor and storage arrangements of the types illustrated in FIG. 5 are well known to those having ordinary skill in the art. In one embodiment, the processing techniques described herein are implemented as a combination of executable instructions and data within the storage component 504.

As shown, the device 500 may comprise one or more user input devices 506, a display 508, a peripheral interface 510, other output devices 512 and a network interface 514 in communication with the processor 502. The user input device 506 may comprise any mechanism for providing user input (such as inputs specifying query topics, entity types, etc. as described below) to the processor 502. For example, the user input device 506 may comprise a keyboard, a mouse, a touch screen, microphone and suitable voice recognition application or any other means whereby a user of the device 500 may provide input data to the processor 502. The display 508, may comprise any conventional display mechanism such as a cathode ray tube (CRT), flat panel display, or any other display mechanism known to those having ordinary skill in the art. The peripheral interface 510 may include the hardware, firmware and/or software necessary for communication with various peripheral devices, such as media drives (e.g., magnetic disk or optical disk drives), other processing devices or any other input source used in connection with the instant techniques. Likewise, the other output device(s) 512 may optionally comprise similar media drive mechanisms, other processing devices or other output destinations capable of providing information to a user of the device 500, such as speakers, LEDs, tactile outputs, etc. Finally, the network interface 514 may comprise hardware, firmware and/or software that allows the processor 502 to communicate with other devices via wired or wireless networks, whether local or wide area, private or public, as known in the art. For example, such networks may include the World Wide Web or Internet, or private enterprise networks, as known in the art.

While the device 500 has been described as one form for implementing the techniques described herein, those having ordinary skill in the art will appreciate that other, functionally equivalent techniques may be employed. For example, as known in the art, some or all of the executable instruction implemented functionality may be implemented using firmware and/or hardware devices such as application specific integrated circuits (ASICs), programmable logic arrays, state machines, etc. Further still, other implementations of the device 500 may include a greater or lesser number of components than those illustrated. Once again, those of ordinary skill in the art will appreciate the wide number of variations that may be used is this manner.

As described above, the instant disclosure describes techniques for determining one or more code quality indices based on coding violation indications. By categorizing the coding violation indications, which may be provided through automated or manual analysis, according to a plurality of coding quality attributes, simplified yet meaningful code quality indices may be provided. For at least these reasons, the above-described techniques represent an advancement over prior art teachings.

While particular preferred embodiments have been shown and described, those skilled in the art will appreciate that changes and modifications may be made without departing from the instant teachings. For example, in an embodiment, the above-described techniques for determining a code quality index for a particular coding quality attribute may be applied to only certain portions of the code base. This may be particularly applied to certain portions of code having a relatively large number of coding violation indications. For example, counts of the critical/major/minor violations attributable to a given software module (as opposed to an entire coding quality attribute across the entire codebase) may be normalized as described above based on the size of the module. Thereafter, a CQI mapping of the type illustrated in Table 4 may be employed to determine a code quality index for that module alone. In this manner, certain quality "hot spots" may be directly assessed to highlight particularly troublesome portions of the overall software code. Furthermore, while various examples related to the "JAVA" programming language have been set forth above, those having ordinary skill in the art will appreciate that the various embodiments described herein are readily applicable to virtually any programming language/technology platform.

It is therefore contemplated that any and all modifications, variations or equivalents of the above-described teachings fall within the scope of the basic underlying principles disclosed above and claimed herein.

We claim:

1. A method comprising:
   receiving, by a device, a plurality of coding violation indications associated with one or more portions of code;
   categorizing, by the device, the plurality of coding violation indications based on a plurality of coding quality attributes to create a plurality of categorized violation indications;
   determining, by the device and based on the plurality of categorized violation indications, a first code quality index for each of the plurality of coding quality attributes,
      the first code quality index being determined based on an automated review of each of the plurality of coding violation indications;
   receiving, by the device, information associated with a second code quality index for each of the plurality of coding quality attributes,
      the information associated with the second code quality index for each of the plurality of coding quality attributes being determined based on a manual review of each of the plurality of coding violation indications;
   determining, by the device and based on the first code quality index and the second code quality index, a third code quality index,
      the third code quality index being an average of the first code quality index and the second code quality index; and
   providing, by the device and for presentation, quality information associated with the one or more portions of the code,
      the quality information including:
         information identifying each of the plurality of coding quality attributes,
         a respective first code quality index associated with each of the plurality of coding quality attributes,
         a respective second code quality index associated with each of the plurality of coding quality attributes, and
         a respective third code quality index associated with each of the plurality of coding quality attributes.

2. The method of claim 1, where at least some of the plurality of coding violation indications are received by at least one automated review tool.

3. The method of claim 1, where at least some of the plurality of coding violation indications are provided by a user interface.

4. The method of claim 1, where the quality information is provided, for display, in a single window.

5. The method of claim 1, further comprising:
   applying a color coding to each of the respective first code quality index, the respective second code quality index, and the respective third code quality index based on the plurality of coding violation indications.

6. The method of claim 1, where the respective first code quality index, the respective second code quality index, and the respective third code quality index are each associated with a particular value and, when providing the quality information for presentation, the method further comprises:
   providing, for presentation, the respective first code quality index, the respective second code quality index, and the respective third code quality index in one or more groupings based on a respective particular value associated with each of the respective first code quality index, the respective second code quality index, and the respective third code quality index.

7. The method of claim 1, where, when determining the first code quality index for each of the plurality of coding quality attributes, the method further comprises:
   determining an attribute violation count for a portion of the plurality of categorized violation indications corresponding to at least one coding quality attribute of the plurality of coding quality attributes;
   normalizing the attribute violation count to create a normalized attribute violation count; and
   determining the first code quality index for each of the plurality of coding quality attributes based on the normalized attribute violation count.

8. The method of claim 7, where, when normalizing the attribute violation count, the method further comprises:
   normalizing the attribute violation count based on a size of software code associated with the plurality of coding violation indications.

9. An apparatus comprising:
   a memory to store instructions; and
   a processor to execute the instructions to:
      receive a plurality of coding violation indications associated with one or more portions of code;

categorize the plurality of coding violation indications based on a plurality of coding quality attributes to create a plurality of categorized violation indications;

determine, based on the plurality of categorized violation indications, a first code quality index for each of the plurality of coding quality attributes, the first code quality index being determined based on an automated review of each of the plurality of coding violation indications;

receive information associated with a second code quality index for each of the plurality of coding quality attributes, the information associated with the second code quality index for each of the plurality of coding quality attributes being determined based on a manual review of each of the plurality of coding violation indications;

determine, based on the first code quality index and the second code quality index, a third code quality index, the third code quality index being an average of the first code quality index and the second code quality index; and provide, for presentation, quality information associated with the one or more portions of code, the quality information including:

information identifying each of the plurality of coding quality attributes, a respective first code quality index associated with each of the plurality of coding quality attributes, a respective second code quality index associated with each of the plurality of coding quality attributes, and a respective third code quality index associated with each of the plurality of coding quality attributes.

10. The apparatus of claim 9, where the processor is further to:

receive the plurality of coding violation indications from at least one automated review tool.

11. The apparatus of claim 9, where the processor is further to:

receive at least some of the plurality of coding violation indications from a user interface.

12. The apparatus of claim 9, where the processor is further to:

apply a color coding to each of the respective first code quality index, the respective second code quality index, and the respective third code quality index based on the plurality of coding violation indications.

13. The apparatus of claim 9, where the respective first code quality index, the respective second code quality index, and the respective third code quality index are each associated with a particular value and the processor, when providing the quality information for presentation, is further to:

provide, for presentation, the respective first code quality index, the respective second code quality index, and the respective third code quality index in one or more groupings based on a respective particular value associated with each of the respective first code quality index, the respective second code quality index, and the respective third code quality index.

14. The apparatus of claim 9, where the processor, when determining the first code quality index for each of the plurality of coding quality attributes, is further to:

determine an attribute violation count for a portion of the plurality of categorized violation indications corresponding to at least one coding quality attribute of the plurality of coding quality attributes;

normalize the attribute violation count to create a normalized attribute violation count; and determine the first code quality index for each of the plurality of coding quality attributes based on the normalized attribute violation count.

15. The apparatus of claim 14, where the processor, when normalizing the attribute violation count, is further to:

normalize the attribute violation count based on a size of software code associated with the plurality of coding violation indications.

16. A non-transitory computer readable medium storing instructions, the instructions comprising:

one or more instructions which, when executed by at least one processor, cause the at least one processor to:

receive a plurality of coding violation indications associated with one or more portions of code;

categorize the plurality of coding violation indications based on a plurality of coding quality attributes to create a plurality of categorized violation indications;

determine, based on the plurality of categorized violation indications, a first code quality index for each of the plurality of coding quality attributes, the first code quality index being determined based on an automated review of each of the plurality of coding violation indications;

receive information associated with a second code quality index for each of the plurality of coding quality attributes, the information associated with the second code quality index for each of the plurality of coding quality attributes being determined based on a manual review of each of the plurality of coding violation indications;

determine, based on the first code quality index and the second code quality index, a third code quality index, the third code quality index being an average of the first code quality index and the second code quality index; and provide, for presentation, quality information associated with one or more portions of code, the quality information including:

information identifying each of the plurality of coding quality attributes, a respective first code quality index associated with each of the plurality of coding quality attributes, a respective second code quality index associated with each of the plurality of coding quality attributes, and a respective third code quality index associated with each of the plurality of coding quality attributes.

17. The non-transitory computer readable medium of claim 16, where the one or more instructions further comprise:

one or more instructions to apply a color coding to each of the respective first code quality index, the respective second code quality index, and the respective third code quality index based on the plurality of coding violation indications.

18. The non-transitory computer readable medium of claim 16, where the respective first code quality index, the respective second code quality index, and the respective third code quality index are each associated with a particular value and the one or more instructions to provide the quality information for presentation further comprise:

one or more instructions to provide, for presentation, the respective first code quality index, the respective second code quality index, and the respective third code quality index in one or more groupings based on a respective particular value associated with each of the respective first code quality index, the respective second code quality index, and the respective third code quality index.

19. The non-transitory computer readable medium of claim 16, where the one or more instructions to determine the first code quality index for each of the plurality of coding quality attributes further comprise:

one or more instructions to determine an attribute violation count for a portion of the plurality of categorized violation indications corresponding to at least one coding quality attribute of the plurality of coding quality attributes;

one or more instructions to normalize the attribute violation count to create a normalized attribute violation count; and one or more instructions to determine the first code quality index for each of the plurality of coding quality attributes based on the normalized attribute violation count.

20. The non-transitory computer readable medium of claim 19, where the one or more instructions to normalize the attribute violation count further comprise:

one or more instructions to normalize the attribute violation count based on a size of software code associated with the plurality of coding violation indications.

* * * * *